United States Patent
Jimenez-Delgado et al.

(10) Patent No.: US 11,900,363 B2
(45) Date of Patent: Feb. 13, 2024

(54) COMPUTER-IMPLEMENTED SYSTEM AND METHOD FOR DETERMINING THE STATE OF A MACHINE EXECUTABLE CONTRACT IMPLEMENTED USING A BLOCKCHAIN

(71) Applicant: nChain Licensing AG, Zug (CH)

(72) Inventors: Pedro Jimenez-Delgado, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 71 days.

(21) Appl. No.: 17/678,911

(22) Filed: Feb. 23, 2022

(65) Prior Publication Data
US 2022/0253835 A1    Aug. 11, 2022

Related U.S. Application Data

(63) Continuation of application No. 16/482,227, filed as application No. PCT/IB2018/050516 on Jan. 29, 2018, now Pat. No. 11,263,622.

(30) Foreign Application Priority Data

Jan. 31, 2017 (GB) ................................ 1701589

(51) Int. Cl.
G06F 16/182 (2019.01)
G06F 16/901 (2019.01)
(Continued)

(52) U.S. Cl.
CPC ..... G06Q 20/3678 (2013.01); G06F 16/1837 (2019.01); G06Q 20/0658 (2013.01); G06Q 20/405 (2013.01); H04L 9/0637 (2013.01)

(58) Field of Classification Search
CPC .......... G06Q 20/3678; G06Q 20/0658; G06Q 20/405; G06Q 2220/00; G06Q 10/103;
(Continued)

(56) References Cited

U.S. PATENT DOCUMENTS 10,838,846 B1   11/2020   Saleh-Esa
11,087,322 B2   8/2021    Vincent
(Continued)

FOREIGN PATENT DOCUMENTS

CN    106503053 A  *  3/2017  ......... G06F 16/2453
CN    106503053 A     3/2017
(Continued)

OTHER PUBLICATIONS

English translation of written description for WIPO WO 2016/127721 A1, 9 pages, published on Aug. 18, 2016 (Year: 2016).*
(Continued)

*Primary Examiner* — James D Nigh
(74) *Attorney, Agent, or Firm* — Davis Wright Tremaine LLP

(57) ABSTRACT

Systems and methods are disclosed for establishing information on a state of a machine-executable contract in the context of unspent transactions (UTXOs), blockchain and deterministic finite automaton implementation of contracts, and determination of states within those. Stages of a method include determining information of interest and codes or tags identifying that information, constructing metadata associated with those codes or tags, and combining the metadata with a public key for an agent associated with the information. ScriptPubKey values of each script are used to provide keys for constructing a database and mapping the keys from the scriptPubKey values, linked to the information. A derivation of script hash addresses from the scriptPubKey values is used to populate a digital wallet. A search and match algorithm is used to find UTXOs with matching script hash addresses on a blockchain. The database is populated with UTXOs that match the script hash addresses and keys to complete the combinations. A match indicates the state.

20 Claims, 3 Drawing Sheets

US 11,900,363 B2

Page 2

(51) Int. Cl.
*G06Q 20/36* (2012.01)
*G06Q 20/06* (2012.01)
*G06Q 20/40* (2012.01)
*H04L 9/06* (2006.01)
*H04L 9/00* (2022.01)
*H04L 9/32* (2006.01)
*G06Q 10/10* (2023.01)

(58) Field of Classification Search
CPC ............. G06F 16/1837; G06F 16/9024; H04L 9/0637; H04L 9/50; H04L 9/3239; H04L 2209/56
USPC ......................................................... 705/69
See application file for complete search history.

(56) References Cited

U.S. PATENT DOCUMENTS

| | | | |
|---|---|---|---|
| 11,238,450 | B2 | 2/2022 | Vincent |
| 11,429,956 | B2 | 8/2022 | Bartolucci et al. |
| 2015/0324789 | A1 | 11/2015 | Dvorak et al. |
| 2016/0085955 | A1 | 3/2016 | Lerner |
| 2016/0260095 | A1 | 9/2016 | Ford |
| 2016/0292672 | A1* | 10/2016 | Fay .......................... H04L 43/08 |
| 2016/0342994 | A1 | 11/2016 | Davis |
| 2017/0005804 | A1* | 1/2017 | Zinder .................. H04L 9/3239 |
| 2017/0180134 | A1 | 6/2017 | King |
| 2017/0187535 | A1* | 6/2017 | Middleton ............ H04L 9/3247 |
| 2017/0287090 | A1 | 10/2017 | Hunn et al. |
| 2017/0317997 | A1 | 11/2017 | Smith et al. |
| 2018/0253724 | A1 | 9/2018 | Smith et al. |
| 2019/0080392 | A1 | 3/2019 | Youb et al. |
| 2019/0121988 | A1 | 4/2019 | van de Ruit et al. |
| 2019/0280861 | A1 | 9/2019 | Smith et al. |
| 2019/0356641 | A1 | 11/2019 | Isaacson et al. |
| 2019/0378119 | A1 | 12/2019 | Hyuga et al. |
| 2020/0177377 | A1 | 6/2020 | Smith et al. |

FOREIGN PATENT DOCUMENTS

| | | | |
|---|---|---|---|
| WO | 2015171580 | A1 | 11/2015 |
| WO | 2016127721 | A1 | 8/2016 |
| WO | WO-2016127721 | A1 * | 8/2016 |
| WO | 2017004527 | A1 | 1/2017 |
| WO | 2017010455 | A1 | 1/2017 |

OTHER PUBLICATIONS

English translation of written description for CN106503053, 12 pages, published on Mar. 15, 2017 (Year: 2017).*
Doran, A forensic look at Bitcoin Cryptocurrency—A Capstone Project Submitted to the Faculty of Utica College, May 2014, 72 pages (Year: 2014).*
Antonopoulos, "Mastering Bitcoin—Unlocking Digital Cryptocurrencies," O'Reilly Media, Inc., Dec. 20, 2014, 282 pages.
Decker et al., "Bitcoin Transaction Malleability and MtGox," European Symposium on Research in Computer Security, Sep. 6, 2014, 13 pages.
Doran, "A Forensic look at Bitcoin Cryptocurrency—A Capstone Project Submitted to the Faculty of Utica College," ProQuest LLC, Master of Science in Cybersecurity Thesis, May 2014, 72 pages.
Guyot-Sionnest et al., "bitcoin-abe," GitHub, https://github.com/bitcoin-abe/bitcoin-abe/blob/master/README-MYSQL.txt, Nov. 28, 2016 [retrieved Feb. 24, 2017], 3 pages.
International Search Report and Written Opinion dated Mar. 1, 2018, Patent Application No. PCT/IB2017/058009, 11 pages.
International Search Report and Written Opinion dated Mar. 15, 2018, Patent Application No. PCT/IB2017/058007, 11 pages.
International Search Report and Written Opinion dated Mar. 15, 2018, Patent Application No. PCT/IB2017/058008, 11 pages.
International Search Report and Written Opinion dated May 30, 2018, Patent Application No. PCT/IB2018/050516, 17 pages.
Maksim et al., "Toshi," GitHub, https://github.com/coinbase/toshi, Oct. 29, 2016 [retrieved Feb. 24, 2017], 4 pages.
Maxwell, "Re: [Bitcoin-development] BIP 65 and OP_CHECKLOCKTIMEVERIFY inquiry . . . ," The Mail Archive, Nov. 27, 2014 [retrieved Mar. 27, 2017], https://www.mail-archive.com/bitcoindevelopment@lists.sourceforge.net/msg06536.html, 3 pages.
Nakamoto, "Bitcoin: A Peer-to-Peer Electronic Cash System," Bitcoin, Oct. 31, 2008, https://bitcoin.org/bitcoin.pdf, 9 pages.
Pacia et al., "OpenBazaar—Ratings, Reviews, and Reputation," Jul. 9, 2015, http://www.slideshare.net/drwasho/openbazaar-ratings-reviews-and-reputation?from_m_app=android, 82 pages.
Pass et al., "Micropayments for Decentralized Currencies," Proceedings of the 22nd ACM SIGSAC Conference on Computer and Communications Security, Feb. 18, 2016 version (first disclosed Oct. 12, 2015), 31 pages.
Seijas et al., "Scripting smart contracts for distributed ledger technology," Cryptology ePrint Archive, Report 2016/1156, Dec. 16, 2016, 30 pages.
UK Commercial Search Report dated Apr. 5, 2017, Patent Application No. GB1621827.3, 5 pages.
UK Commercial Search Report dated Apr. 5, 2017, Patent Application No. GB1621830.7, 5 pages.
UK Commercial Search Report dated Apr. 5, 2017, Patent Application No. GB1621831.5, 5 pages.
UK Commercial Search Report dated Mar. 2, 2017, Patent Application No. GB1701589.2, 5 pages.
UK IPO Search Report dated Jul. 19, 2017, Patent Application No. GB1701589.2, 5 pages.
UK IPO Search Report dated Jul. 3, 2017, Patent Application No. GB1621831.5, pages.
UK IPO Search Report dated Jun. 30, 2017, Patent Application No. GB1621827.3, 3 pages.
UK IPO Search Report dated Jun. 30, 2017, Patent Application No. GB1621830.7, 4 pages.
Underwood, "Blockchain Beyond Bitcoin," Communications of the ACM 59(11):15-17, Oct. 2016.
Vey, "The Value Chain Applied to the UK's Independent Film Industry," Department of Computing Imperial College London Masters of Engineering in Computing (Artificial Intelligence) Thesis, Jun. 2016, http://www.imperial.ac.uk/media/imperial-college/faculty-ofengineering/computing/public/AlanVey.pdf, 141 pages.
Wijaya, "Extending asset management system functionality in bitcoin platform", 2016 International Conference on Computer, Control, Informatics and its Applications (IC3INA), Oct. 3, 2016, 5 pages.
Wuille, "Re: [Bitcoin-development] Alternative to OP Eval," The Mail Archive, Dec. 29, 2011 [retrieved Mar. 27, 2017], https://www.mail-archive.com/bitcoindevelopment@lists.sourceforge.net/msg00611.html, 3 pages.
Satoshi et al., "Connection Limits," Bitcoin Forum, Aug. 9, 2010, https://bitcointalk.org/index.php?topic=741.0; brev_next=prev, 2 pages.

* cited by examiner

| Transaction identifier | origination *o* |
|---|---|
| Version number | <version number> |
| Number of inputs | 1 |
| Input — Previous transaction Hash | <10 mBTC from originator> |
| Input — Previous transaction Output index | 00 |
| Input — Length of signature script | <unlocking script length> |
| Input — Signature script | <originator signature> <originator public key> |
| Input — Sequence number | <sequence number> |
| Number of outputs | 2 |
| Output 0 — Value | 600000 |
| Output 0 — Length of public key script | <locking script length> |
| Output 0 — Public key script | OP_HASH160 <state $s_0$ redeem script hash> OP_EQUAL |
| Output 1 — Value | 300000 |
| Output 1 — Length of public key script | <locking script length> |
| Output 1 — Public key script | OP_DUP OP_HASH160 <Botnet agent public key hash> OP_EQUALVERIFY OP_CHECKSIG |
| Locktime | 0 |

Fig. 1

```
metadata = "o2" + sha256 (state)   # state = hex version of the utf 8 code defining the contract state
redeemScript = "51" + "21" + metadata + "21" + pubKey + "52" + "ae"   # pubKey = public key of the agent
scriptPubKey = "a9" + "14" + hash160(redeemScript) + "87"   # P2SH scriptPubKey
temp = versionbyte + hash160(redeemScript)   # versionbyte depends on the network
checksum = hash256(temp)
address = b58encode(temp + checksum)   # Script hash address
```

Fig. 2

COMPUTER-IMPLEMENTED SYSTEM AND METHOD FOR DETERMINING THE STATE OF A MACHINE EXECUTABLE CONTRACT IMPLEMENTED USING A BLOCKCHAIN

CROSS-REFERENCE TO RELATED APPLICATIONS

This application is a continuation of U.S. patent application Ser. No. 16/482,227, filed Jul. 30, 2019, entitled "COMPUTER-IMPLEMENTED SYSTEM AND METHOD FOR DETERMINING THE STATE OF A MACHINE EXECUTABLE CONTRACT IMPLEMENTED USING A BLOCKCHAIN," which is a 371 of Nationalization Patent Application of International Patent Application No. PCT/IB2018/050516, filed Jan. 29, 2018, entitled, "COMPUTER-IMPLEMENTED SYSTEM AND METHOD FOR DETERMINING THE STATE OF A MACHINE EXECUTABLE CONTRACT IMPLEMENTED USING A BLOCKCHAIN," which claims priority to United Kingdom Patent Application No. 1701589.2, filed Jan. 31, 2017, entitled "COMPUTER-IMPLEMENTED SYSTEM AND METHOD," the disclosures of which are incorporated herein by reference in their entirety.

BACKGROUND OF INVENTION

This invention relates generally to systems, such as computer-implemented systems and methods, and more particularly to computer-implemented systems and methods for establishing information on states. The invention is particularly suited to use in blockchain and deterministic finite automaton (DFA) implementation of contracts and the determination of states within those.

SUMMARY OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

One area of current research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

One problem with blockchain technology is that of being able to find information of interest on the blockchain. A number of prior art documents disclose methodologies related to finding information of interest on a blockchain. Examples of such prior art methodologies are briefly described below.

A presentation by Chris Pacia et al. entitled "OpenBazaar Ratings, reviews and reputation" discloses a blockchain based ratings system. When a buying transaction occurs money is exchanged between the buyer and the seller. The buyer can also leave a review of the services provided for others to see. Data such as the vendors Globally Unique Identifier (GUID), the serialized rating and a contract hash, are added to an OP_RETURN. The slides disclose the function of searching reviews left by the users by querying the OP_RETURN outputs of the blockchain where the vendor has been tagged.

US 2016292672 discloses a trading system which utilizes a blockchain storage system. It is disclosed that the trading system queries the blockchain system to check that a trading party owns shares to be traded prior to implementing a trade. This is achieved by determining if there are unspent transactions which are owned by the trader corresponding to the shares to be traded.

US 2017005804 discloses a system in which a blockchain is searched for assets owned by a specific person that wishes to conduct a financial transaction. This verification is accomplished by accessing the blockchain and determining that a source participant is associated with unspent output blockchain transactions that are linked to a sufficient quantity of the asset in question. This process may include summing multiple different blockchain transactions that are associated with the source participant to determine a total asset quantity that is "owned" by the source participant.

An issue with existing systems and methods is that the extraction of certain types of information, such as the state of a machine executable contract implemented on a blockchain, is not possible, or at least is difficult to achieve in an efficient manner. This makes implementation of machine executable contracts, for example through the use of deterministic finite automaton (DFAs), more difficult.

Thus, it is desirable to provide a solution which allows for the extraction of information, despite the material degrees of transformation that information has undergone by the time it is broadcast to the blockchain.

SUMMARY OF INVENTION

Such an improved solution has now been devised. The present invention is defined in the appended claims and/or the statements of invention and/or in the features, options and possibilities set out within this document.

According to a first aspect the invention provides a method of searching for information contained in unspent outputs (UXTO's) of a blockchain, the method including:
a) determining information of interest and obtaining a key related to that information of interest;
b) constructing a search term related to the key;
c) searching the blockchain for unspent outputs (UXTO's) matching the search term.

The method may provide a method of searching for the state of a machine-executable smart contract. The method may provide a method of searching for the state of a machine-executable smart contract implemented in a DFA. For example, a method of determining a state of a machine-executable contract implemented on a blockchain may be provided, the method including:
a) determining information of interest and generating a cryptographic key related to that information of interest;
b) constructing a search term related to the cryptographic key;
c) searching the blockchain for unspent outputs (UXTO's) matching the search term,
wherein the information of interest is a state of a machine-executable smart contract, and
the method further comprises:
d) extracting information from the unspent outputs (UXTO's) matching the search term, and
e) determining the state of the machine-executable smart contract from the extracted information, wherein the machine-executable smart contract may be implemented using a deterministic finite automaton and the step of determining the state of the machine-executable smart contract may comprise determining a state of the deterministic finite automaton.

The method may provide that the key is obtained by passing the information of interest through one or more stages. The one or more stages to obtain the key may include: a specification stage; a metadata construction stage; an agent association stage; a combination stage; a valuing stage. The key may be the output from the valuing stage.

The method may provide that the key is obtained by applying a reproducible process to the information of interest, the same reproducible process having generated the information contained in unspent outputs (UXTO's) of a blockchain being searched for.

The method may provide that the search term is constructed from the key, for instance through an address derivation stage.

The method may provide that the searching is provided by a search and matching stage.

The method may provide that unspent outputs (UXTO's) matching the search term are paired with the key and/or with the information of interest. The pairing may be provided within a database and/or a databasing stage.

The method may include one or more of: a specification stage; a metadata construction stage; an agent association stage; a combination stage; a valuing stage; a databasing stage; an address derivation stage; a wallet formation stage; a search and matching stage.

The possibilities for each of these stages are detailed further below.

The first aspect of the invention may include any of the features, options and possibilities set out elsewhere within this document.

According to a second aspect the invention provides a system, preferably a computer implemented system, arranged to implement the method of the first aspect of the invention, potentially including a system arranged to perform any of the features, options and possibilities set out elsewhere within this document.

The system may comprise of further comprise:
at least one computing agent arranged to implement a DFA via a blockchain; and
a blockchain platform.

The second aspect of the invention may include any of the features, options and possibilities set out elsewhere within this document.

Therefore, in accordance with the invention there may be provided or further provided options, possibilities and features from amongst the following.

The method and/or system may include a specification stage. The specification stage may include selecting the information of interest. The specification stage may include or be an identifier specification stage. The specification stage may include or be a code or tag specification stage.

The information of interest may be a selection from the information set. The information of interest may be a state, preferably a state of a deterministic finite automaton, most preferably a state of a machine-executable smart contract. The information set may be limited, for instance to the limited possible states for a DFA.

The information of interest may be selected by a user. The information of interest may be selected by a DFA. The information of interest may be selected by one or more agents in a network.

One or more identifiers for the information of interest may be determined. An identifier may be a code. An identifier may be a tag. A code may be indicative of only one information of interest, such as one state. A tag may be indicative of only one information of interest, such as one state.

The method and/or system may include a metadata construction stage. The information of interest, more preferably the code or tag therefor, may be converted to metadata. The information of interest, more preferably the code or tag therefor, may be processed by a cryptographic hash, ideally two such cryptographic hashes are applied in series. The metadata, particularly the hashed metadata, may be subsequently formatted. The information of interest, preferably the code or tag therefor, more preferably the metadata thereof may be incorporated into a public key. The public key may be designated an information public key.

The method and/or system may provide an agent association stage. The agent association stage may selected one or more agents, preferably one or more agents assigned to execute the UXTO, for instance a UXTO from a machine-executed smart contract, preferably one implemented by a DFA. One or more or all of the selected agents may provide public keys. The one or more public keys may be designated agent public keys.

The method and/or system may provide a combination stage, preferably a public key combination stage. The combination stage may combine an information public key with one or more agent public keys. The combination stage may generate a multi-signature redeem script, such as a P2SH multi-signature redeem script. The combination stage may provide a locking script, ideally from the information public key and the one or more agent public keys. The combination stage may generate a hash of the locking script. The hash of the locking script may be designated a scriptPubKey.

The method and/or system may include a valuing stage to obtain a value. The method and/or system may include a locking script valuing stage to obtain a value, such as a locking script value. The method and/or system may include a scriptPubKey valuing stage, for instance to obtain a value, such as a locking script value or a scriptpubKey value. The valuing stage may obtain a value for a locking script or more preferably for a hash of the locking script and still more preferably for a scriptPubKey.

The method and/or system may include a databasing stage, for instance to provide construction of a database.

The database may be external to the blockchain. The database may be centralised. The database may be decentralised, for instance within a network, potentially as a distribute hash table. The databasing may be conducted using a Python dictionary. The database is preferably accessible to each node in the network, such as a distributed network. One or more or all nodes may be provided with a computing agent.

The databasing stage may include mapping information of interest to a key. The key may be the value from the valuing stage, such as the value for the locking script, more preferably the value for the scriptPubKey. A key may be linked to a single value. A key may be linked to a single code or tag. A key may be linked to a single information of interest. The mapping of information to the key may provide one half of the mapping of a combination to the key. The other half of the combination may be mapped to the key in a search and matching stage. The databasing stage and/or the mapping may be implemented as a hash table.

The method and/or system may include an address derivation stage, such as a script hash address derivation stage. The addresses may be derived from the information public key and agent public keys, preferably from a locking script, more preferably from a hash of a locking script and ideally from a scriptPubKey. The addresses may be script hash addresses, such as P2SH addresses.

The method and/or system may include a wallet formation stage. The wallet formation stage may include adding one or more or all of the addresses, such as script hash addresses, to a wallet, preferably an account or folder within the wallet.

The method and/or system may include a search and matching stage. The search and matching stage may by implemented by an algorithm. The search and matching stage may include looking in the blockchain for one or more matches with the addresses, such as the script hash addresses. The search and matching stage may obtain the addresses, such as the script hash addresses from a wallet, ideally from the wallet of the wallet formation stage. The search and matching stage may acquire details of UTXO's in the blockchain which match to the addresses used in the search.

The method and/or system may include, potentially within the search and matching stage and/or within the databasing stage, mapping acquired details of UXTO's matching an address to a key. As before noted, the key to which that mapping occurs may be linked to a single value, or to a single code or tag, or to a single information of interest. As a consequence, the mapping of the other half of the combination to the key is provided in the search and matching stage.

When a match is obtained, the method and/or system may been deemed to have unequivocally determined which information of interest, such as a tag or a state, is present in the UTXO.

The method and/or system may seek matches with more than one information of interest at the same time.

Computer-implemented systems and methods are thus detailed for establishing information on states of a machine executable contract, for instance in the context of unspent transactions (UTXOs), blockchain, and deterministic finite automaton (DFA) implementation of contracts and the determination of states within those. The stages can include determining the information of interest and the codes or tags identifying that information, constructing the metadata associated with those codes or tags, combining that with a public key for an agent that will be associated with the information. The scriptPubKey values of each script may be used to provide the keys for use in constructing an external database and more specifically mapping the keys from the scriptPubKey values, linked to the information of interest. To obtain the other half of the combination, there is a derivation of the script hash addresses from the scriptPubKey values, with those being used to populate a digital wallet. A search and match algorithm is then used to find UTXO's with matching script hash addresses on the blockchain. These then populate the aforementioned database with UTXO's that match to the script hash addresses and hence to the keys to complete the combinations. A match indicates in a definitive manner the state.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 1 illustrates a blockchain transaction, including a scriptPubKey, in a P2SH transaction;

FIG. 2 is presents pseudocode illustrating the construction of metadata, P2SH redeem script, scriptPubKey and Bitcoin address in an embodiment of the invention;

DETAILED DESCRIPTION

Figure 3:
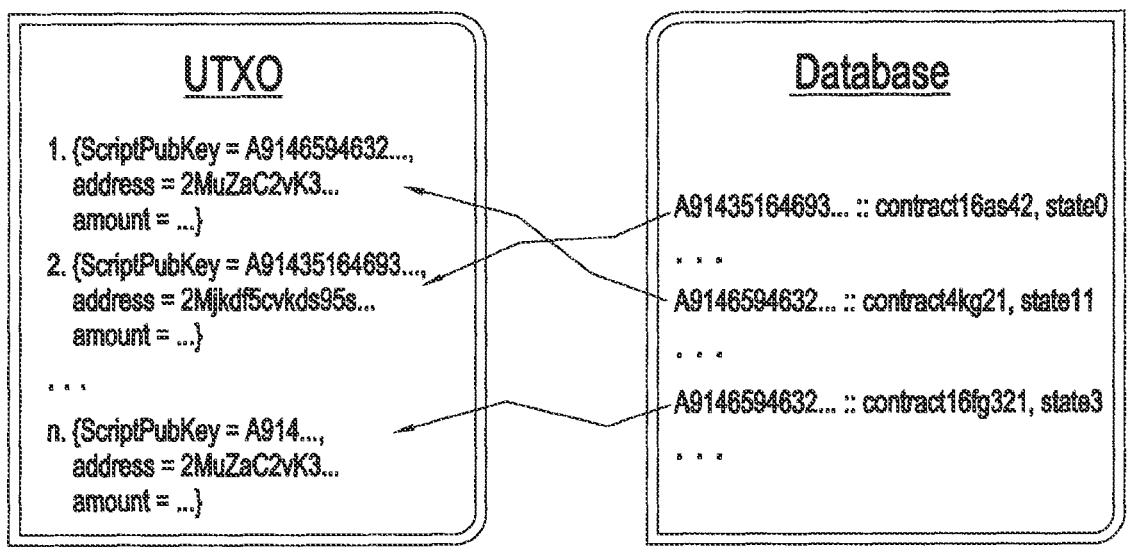
FIG. 3 is a diagram describing the mapping of UTXOs to the information contained in an external database according to an embodiment of the invention.

Unspent transaction outputs, UTXO's are a fundamental of feature of the blockchain. A very wide variety of transactions for a very wide variety of assets are possible through the blockchain. The number of UTXO's is massive and they are known to each full-node bitcoin client and as a whole form the UTXO set or UTXO pool.

A UTXO is formed of an amount of bitcoin and a locking script or encumbrance, typically related to a specific user address. For many transactions varieties, a data portion is also present in the UTXO to incorporate information into the blockchain transaction. The data portion may be in the form of codes, tags or metadata. The ability to find particular codes, tags or metadata and/or the ability systematically find and extract the information stored in a general blockchain is not presently viable and is amongst the potential issues this inventions seeks to solve.

The present invention seeks to address this and render access to the information possible by extracting it from the blockchain.

The difficulty in finding the codes, tags or metadata, and even more so extracting the information, is apparent from a consideration of how the UTXO and its data portion content arise.

In general, the format of blockchain transactions imposes that the information stored therein comes in the form of long chains of bytes. This information has to be filtered and processed before it can be useful. In addition, it is unfeasible to reconstruct the original information, a meaningful message for instance, from those chains of bytes, since for security, privacy, as well as technical reasons, the chain actually stored is some form of (multiple) hash. For instance, Bitcoin addresses are multiple hash of a public key, with the multiple hash then formatted. A similar position applies for a signature script or blockchain transaction puzzle obtained via a similar process. This may be to make it acceptable by the network; for instance it has to have the shape of a cryptographic public key, etc.

A specific embodiment, which is used below to exemplify the implementation of the invention is a blockchain-based deterministic finite automaton, DFA, in relation to which the information of interest is the state of the DFA. In the specific example, it is assumed that the UTXO of interest are of the type pay-to-script-hash (P2SH). It is further considered that one agent is assigned to execute (spend) the transactions associated with a particular state of the state machine.

In a first step in this specific embodiment, the information (a tag or code identifying the state of the DFA) is first hashed to construct a metadata field which is included in a public key. The metadata field within the form of a public key is combined with the public key of the agent in charge (to provide the encumbrance). The result is placed in a 1 of 2 multi-signature redeem script of a P2SH. This redeem script is, in turn, hashed and combined with other bytes carrying additional information in order to derive the locking script (scriptPubKey) which is finally placed as part of the chain of bytes making up a blockchain transaction.

It should be clear that having gone through these step, that recovering the original information from that stored in the network is a rather hopeless task at this point in this specific embodiment, just as in the more general case.

The details of the present invention and specific embodiments of it will be discussed in subsequent sections. An overview of the operation of the present invention is provided at this stage. The operation provides for the general steps of:

1. Determine the information of interest and specify the codes or tags identifying that information.
   In the DFA embodiment discussed in more detail below, this might be the particular state of a particular contract embodied as a blockchain based DFA.
2. Construct the metadata associated with those codes or tags.
   In the DFA embodiment this might be the code or tag for a particular state of interest, potentially specific to a particular contract type of interest;
3. Determine which agent (or set of agents) will be associated with the information.
   Again in the DFA embodiment, this may be the agent(s) assigned to spend the UXTO corresponding to the particular state of interest;
4. Combine a public key including the metadata associate with those codes or tags with a public key for the associated agent to give a script;
   In the DFA embodiment, this would be a public key with the metadata and a public key from the agent, then combined into a P2SH multi-signature redeem script;
5. Derive the scriptPubKey values of each script to provide the keys for use in the external database involved in the matching;
   In the DFA embodiment this would be the values expressed as keys that link to the codes and hence to the state of interest;
6. Construct a database to which can be mapped the keys from the scriptPubKey values, linked to the information of interest with the other half of the combination to come in a subsequent stage;
   In the DFA embodiment, the keys are mapped to the codes and hence the states of interest, with the UTXO's to be found, matched and added in due course;
7. Derive the script hash addresses from the scriptPubKey values;
   In the DFA embodiment this also applies;
8. Populate a digital wallet with those script hash addresses;
   In the DFA embodiment this also applies;
9. Use a search and match algorithm to find UTXO's with matching script hash addresses on the blockchain;
   In the DFA embodiment this also applies;
10. Populate the aforementioned database with UTXO's that match to the script hash addresses and hence to the keys to complete the combinations;
    In the DFA embodiment, this means that once the algorithm finds a script hash address of a UTXO that matches, then the system has unequivocally determined which state tag is present in the UTXO, i.e. in essence the state has been detected.

Whilst full recover of the information from the information in the blockchain is a hopeless task, it should be noted that for information known in advance one can still determine whether a certain tag is or is not present in the UTXO of the cryptocurrency. This is the case for the state indicating tags in a DFA system. Thus it is possible to detect whether the DFA machine is in one of its allowed states, or not, based upon this.

It is worth mentioning here that, by construction, a DFA can only be in one of a finite set of states at a time. The detector is, however, equally well suited to detect any number of tags or other kind of known information.

The initial stages reflect the stages discussed above in the overview to transition from the information to the metadata incorporated into a locking script.

Thus, in an initial step, codes specification stage, the information of interest is selected. This information may be the state which is of interest. Those codes or tags which identify that information (such as a particular state) which is to be searched for are then specified. These may be codes or tags selected from the full set of codes or tags for all states detailed in a state transition table. Thus codes specification stage is a notation step and is readily implementable.

Those codes or tags form the input to a second step, metadata construction stage. In this step, the double hashing of the codes or tags converts the codes or tags into a metadata format reflecting those. This metadata is then formatted and placed in an information public key.

A further selection is made with respect to the possible agents associated with a particular state for the contract, agent association stage. The agent or agents are those parties assigned to execute (spend) the UXTO. The agents associated provide an agent public key or agents public keys. The agent or agents is likely to be state dependent in the DFA context. The agent or agents will be a sub-set of the total agents, a listing. The agent or agents are different from the computing agents used to interface with the DFA, as described below. Thus agent association stage is an assignment step and is readily implementable.

The output from the metadata construction stage, the information public key with the metadata within it, and from the agent association stage, the agent public key, are used in the next step, combination stage. In the combination stage, the two public keys (and hence the metadata within the information public key) are combined in a P2SH multi-signature redeem script. The public keys are used to generate the locking script and the locking script is then in turn replaced by a hash of the locking script, a scriptPubKey.

In the next step, scriptPubKey valuing stage, the scriptPubKey value for the one or more hashed locking scripts from combination stage are established. FIG. 1 illustrates the construction of the scriptPubKey, from which the value can be directly obtained, in the context of a P2SH transaction. These scriptPubKey values then act as the keys to the ultimately mapped combinations. At this stage, the keys have a known relationship to the respective codes or tags of interest. The other part of the ultimately mapped combination is found in the search and match stage discussed below.

The mapping of the combinations is constructed in a search term database, databasing stage. The search term database is external to the blockchain. As a result, a dictionary is provided by mapping the keys, which representing the values from the scriptPubKey, with the respective codes or tags of interest. A structure that can map a set of keys to values, a dictionary, is more naturally implemented as a hash table.

It should be noted that the form of the particular database used is not fundamental to the invention and should not limit its scope.

Figure 4:
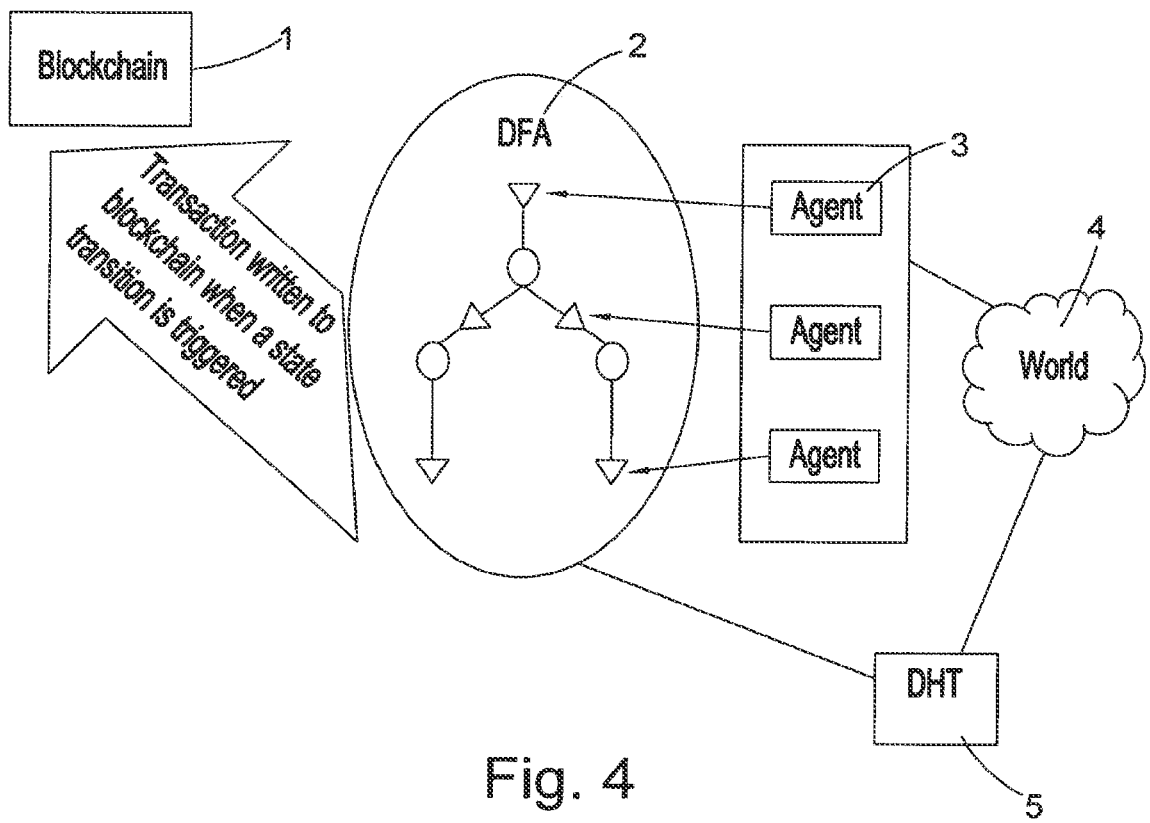
FIG. 4 illustrates an overview of a system into which the invention can be incorporated.

If the system in question, as is the case in the DFA implementation of FIG. 4, is decentralized, either each node of the network should be able to access (locally or remotely) the search term database, or it could also be implemented in a decentralized manner as well, typically as a distributed hash table.

The databasing stage 510 can be carried out by using a Python dictionary, a built-in datatype implementing the concept of a hash table.

In the next stage, script hash address derivation stage, we derive the script hash addresses from the scriptPubKey values, stage 512. In an example approach, for P2SH when creating script hash addresses one uses HASH160 (meaning, first apply SHA256, then RIPEMD160). To the result of these operations one appends (at the beginning of the string) a "versionbyte" value which indicates the network one is using (mainnet, testtet, etc). There is then a calculation of a "checksum," which is the hash256 of the whole thing. Then the process concatenates both strings and encodes the result in base58, and that is the P2SH address. All this changes if one uses another method for the scripts, so it is not essential to the invention and is not limiting as to its scope.

By way of illustration of the step at a technical level, simplified snippets of (pseudo-)code are provided. The language used in these snippets is Python 3 although, as usual, this should by no means limit the scope of the invention or its manner of deployment. FIG. 2 presents pseudocode for the construction of metadata, their combination with the public keys of the agents into a P2SH redeem script, and the derivation of the scriptPubKey and addresses; in effect the above mentioned metadata construction stage, combination stage, scripPubKey valuing stage and script hash address derivation stage.

Having obtained the script hash addresses, the process proceeds to add those addresses to a wallet, wallet formation stage. It is preferred that the addresses are added to a specific contract account within the wallet used.

The search and matching algorithm employed can then be initiated from the wallet to search for the UTXO's which match to those addresses, search and match stage. A match reflects not only a matching agent, but also a matching state for the contract. The search and match stage can be accomplished with standard bitcoin core client commands. Many search and matching algorithms are suitable for this purpose. For instance, all UTXO's can be searched using a loop.

Once the algorithm finds a script hash address value in the UXTO set that matches the script hash address being searched, then a scriptPubKey in the UTXO set of interest has been found. This can be extracted and then mapped into the external database mentioned above. The UXTO is mapped via its scriptPubKey to the key, the key's value and hence back to the code or tag and hence to the original information that is of interest, representing in the preferred embodiment a particular state.

A match in this last stage provides that the system has unequivocally determined which state tag is present in the UTXO, i.e. in essence the state has been detected. The matching process repeats for all UTXO which have matching script hash addresses and hence keys and hence state tags.

An illustration of this mapping of actual known information, i.e. values (contract and state tags in our example), to the keys stored in the blockchain UTXO, effectively pointers to the values, is provided in FIG. 3. Note that if the structure used for the database is a hash table, an additional hashing of the keys occurs before accessing the values desired information, this is not shown in the figure as it is meant to represent the general case.

Once the mapping is effectively a dictionary generation process, then this can be carried out by using a Python dictionary, a built-in datatype implementing the concept of a hash table.

Search Wallet Modification

It is beneficial to the overall simplicity and ease of implementation, if unconventional/specialized software is avoided in the implementation of the state transition detector, or more generally known information search. Of course, such software could be provided as an alternative.

In this context, it is material to note that the only UTXO's which are accessible through the bitcoin core client (the standard user interface it is preferred to use) are those associated to addresses contained in the bitcoin wallet of the user. In the search process, the keys being looked for will not necessarily meet that criteria. To counter this, before a wallet can be used to search the UTXO database for the keys contained as well in the external database, it is necessary to construct the bitcoin addresses associated with the corresponding scriptPubKey values. This is achieved by the hashing and formatting process outlined above. Having constructed them, it is then necessary to add them to the bitcoin wallet of the search user.

In the case of our working example of a blockchain-based DFA implementing a particular contract, it is natural and convenient to associate, in addition, the addresses related to the contract at hand to a particular account, a subset of the wallet. This last step is, however, not strictly necessary and can be taken as a particular feature of our design which provides additional efficiency and structure, rather than a limitation; by no means should this restrict the scope of the invention.

Contexts for Use of the Invention

The ability to extract the known information is desirable in a number of contexts. Such contexts might include those situations where metadata is incorporated into the blockchain. Examples would include tokenization cases or "colored coins" which are used to represent other assets, for instance, shares, certificates, coupons, property, commodities, tokens, data and the like.

One particular context in which the ability to find and extract the information is important is a blockchain based DFA, where the information can be the state of the machine.

Further details of the use of a DFA in the implementation of smart contracts is provided in the next section.

Use of a DFA

This section is provided to give background on how a DFA is useful, with reference to a DFA implementing smart contracts.

In this illustrative context, a definition for a DFA that models a process or task, such as a contract, is provided. The DFA interacts with a related system of computing resources which cay be referred to as computing agents or "bots." These computing agents are arranged to generate the transactions and submit them to the blockchain. Whilst this DFA embodiment relates to contracts, the use of DFA's is not limited to contracts.

Referring to FIG. 4, the embodiment provides the realisation of a process as an abstract DFA incarnated on a computing platform—blockchain—comprising hardware and software components.

FIG. 4 provides an overview of a system arranged in accordance with an illustrative embodiment of the invention. The system comprises computing agents 3 capable of interaction with other entities 4 (e.g. humans or other computers) to receive instructions. These instructions might be, for example, which smart contract to create and execute. Thus, the computing agents 3 interact with the physical world to implement the invention by responding to, and causing, events outside themselves in the "real world."

The specification of the contract itself can be provided in any machine-executable format, e.g. xBRL and stored in a secure and decentralized manner, for example in a distributed hash table (DHT) 5 on the torrent network. From the specification of the contract a computing agent constructs the DFA 2, which is subsequently incarnated on the blockchain 1 by one or more agents.

The DFA 2 itself is specified as a finite set $\{S, I, t, s_0, F\}$, where S stands for the (finite) set of possible states in which the contract/DFA can be; I is a (finite) set of inputs (also known as the alphabet), which in our context means any event or condition which can occur in relation to the contract, e.g., a payment is made, the maturity of the instrument is reached, a counterparty defaults, etc.; in our mechanism these input signals are received/produced by one or more agents, and which then determine the next state of the system (possibly the same one).

The third component of a DFA is a transition function t: $S \times I \rightarrow S$. The term "deterministic" in "DFA" refers to the uniqueness of the decision: given a state and an input there is only one new state (possibly the same one). Thus, given an initial state ($S_0$) and a history of inputs the outcome of the calculation (contract) is unique, one among the set of all possible final outcomes ($F \subseteq S$). Once all these elements have been established, the DFA is completely defined by a transition table, specifying the future states for all possible current states and input signals. The states of the DFA are themselves associated with unspent transaction outputs (UTXO) on the blockchain. As is known in the art, the Bitcoin network continuously tracks all available UTXO. In accordance with the embodiment, the mechanism by which the DFA moves from one state to another is incarnated (implemented) in accordance with the invention by blockchain transactions. Effectively, a transaction on the blockchain spends the UTXO associated with one state (an input of a previous transaction) and creates the UTXO associated with the next state (an output).

Example: Discount (Zero-Coupon) Bond

For the sake of illustration, we now consider a discount (zero-coupon) bond, which is a simple debt instrument usually bought at a price (normally at a discount with respect to its face value), then held for some time until its principal is returned at maturity. The possible states we will consider are $S=\{s_0, f_0, f_1\}$, indicating, respectively, the holding state ($s_0$), the normal conclusion of the contract (if it follows the happy path) or happy ending ($f_0$), and a state ($f_1$) in which things go wrong, e.g. litigation. The final states of the system are thus $F=\{f_0, f_1\}$. The alphabet we will consider is I={r, d, e}, indicating, respectively, repayment of the principal at (or before) expiration ®, default of the issuer at (or before) expiration (d), and expiration of the contract without repayment (e). The transition matrix for this simple contract is presented in Table 1.

TABLE 1 transition table for a DFA representing a zero-coupon bond.

| t | r | d | e |
|---|---|---|---|
| $s_0$ | $f_0$ | $f_1$ | $f_1$ |

It should be noted that the final states represent the completion of the contract, thus no further states need to be specified from them (currently noted as '-' in the transition table, although those lines could be omitted). In principle, more states and/or inputs (as well as actions) could be defined for this instrument, but this has not been done in this document for the sake of simplicity and clarity, to illustrate the fundamentally inventive aspects of the invention rather than injecting distracting detail relating to the complexities of the contract.

Figure 5:
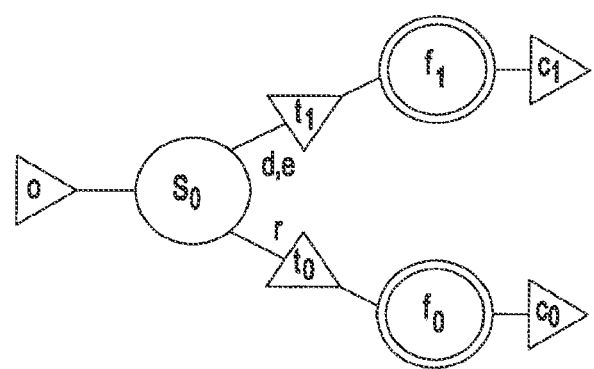
FIG. 5 illustrates a blockchain-based DFA implementation.

FIG. 5 represents the embodiment of the zero-coupon bond DFA on the (Bitcoin) blockchain. The states are represented by circles and the Bitcoin transactions which move the machine from one state to the other by the blue triangles. Note that the inputs received by the agents are omitted in FIG. 5, however in each state one or other transition should occur according to these inputs, which is reflected in the diagram by the construction of one or other Bitcoin transaction (e.g., $t_0$ or $t_1$ in state $s_0$); no transactions are required for transitions which do not change the state, thus they have been omitted. In addition to the transitional transactions of the DFA ($t_1$), an initial origination transaction (o), and transactions corresponding to the completion of the contract ($c_1$) are considered.

We now turn our attention to the flow of funds in the transactions (originations, transitions and completions). An important observation is that because of the finite nature of the DFA, and of (financial) contracts, the process will be completed after a number of transitions. This necessarily implies (assuming some finite fees for the computing agents involved and the Bitcoin miners) that the maximum costs of the establishment and execution of the contract is bound and can be determined in advance, e.g. at the point of establishment of the DFA. It is given by the total amount of funds required to execute the contract following the longest imaginable path. This, of course, excludes the possibility of infinite loops in the execution, note however that this is not relevant for current (financial) contracts, even contracts such as perpetuities are bound to be completed at some point in the future, despite their name; for example, when the indebted entity ceases to exist or the payments become negligible due to inflation.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of searching for information contained in unspent outputs (UTXO's) of a blockchain, the computer-implemented method comprising: for a given state among a plurality of states of a machine-executable smart contract, generating an information public key based on metadata associated with the given state;
constructing a search term related to the information public key; and
searching the blockchain for unspent outputs (UTXOs) matching the search term, wherein the generation of the information public key comprises passing the given state through at least the following stages:
a specification stage,
a metadata construction stage, and
a valuing stage.

2. The computer-implemented method according to claim 1, further comprising:
extracting information from the unspent outputs (UTXOs) matching the search term; and
determining a state of the machine-executable smart contract from the extracted information.

3. The computer-implemented method according to claim 2, wherein the machine-executable smart contract is implemented using a deterministic finite automaton and determining the state of the machine-executable smart contract comprises determining a state of the deterministic finite automaton.

4. The computer-implemented method according to claim 2, wherein the information public key is generated by applying a reproducible process to the given state, the reproducible process having generated the information contained in the unspent outputs (UTXOs) of the blockchain being searched for.

5. The computer-implemented method according to claim 1, wherein the search term is constructed from the information public key.

6. The computer-implemented method according to claim 1, wherein the searching is provided by a search and matching stage and the unspent outputs (UTXOs) matching the search term are paired with the information public key and/or with the metadata associated with the given state.

7. The computer-implemented method according to claim 6, wherein one or more pairings of the unspent outputs (UTXOs) matching the search term with the information public key and/or with the metadata associated with the given state are provided within a database.

8. The computer-implemented method according to claim 1, wherein the specification stage comprises selecting the given state and including a code or tag in the specification stage to identify the given state.

9. The computer-implemented method according to claim 8, wherein the metadata construction stage comprises converting the given state and/or the code or tag to the metadata associated with the given state.

10. The computer-implemented method according to claim 9, wherein the metadata is incorporated into the information public key.

11. The computer-implemented method according to claim 1, further comprising a combination stage, the combination stage comprising generating a locking script.

12. The computer-implemented method according to claim 11, wherein the combination stage generates a hash of the locking script.

13. The computer-implemented method according to claim 11, wherein the valuing stage comprises obtaining a value, from the locking script or a hash of the locking script, to provide the search term.

14. The computer-implemented method according to claim 12, wherein the valuing stage comprises obtaining a value, from the locking script or the hash of the locking script, to provide the search term.

15. The computer-implemented method according to claim 11, further comprising an address derivation stage wherein at least one address is derived from the locking script.

16. The computer-implemented method according to claim 12, further comprising an address derivation stage wherein at least one address is derived from the hash of the locking script.

17. A computer-implemented system, comprising:
   at least one processor; and
   a memory device comprising computer-executable instructions that, upon execution by the at least one processor, cause the computer-implemented system to:
      for a given state among a plurality of states of a machine-executable smart contract, generate an information public key based on metadata associated with the given state;
      construct a search term related to the information public key; and
      search a blockchain for unspent outputs (UTXOs) matching the search term, wherein the generation of the information public key comprises passing the given state through at least the following stages:
         a specification stage,
         a metadata construction stage, and
         a valuing stage.

18. The computer-implemented system according to claim 17, further comprising:
   at least one computing agent arranged to implement a deterministic finite automaton via the blockchain; and
   a blockchain platform.

19. The computer-implemented system according to claim 18, wherein the computer-executable instructions, upon execution by the at least one processor, further cause the computer-implemented system to:
   extract information from the unspent outputs (UTXOs) matching the search term; and
   determine a state of the machine-executable smart contract from the extracted information.

20. The computer-implemented system according to claim 19, wherein the machine-executable smart contract is implemented using the deterministic finite automaton and determining the state of the machine-executable smart contract comprises determining a state of the deterministic finite automaton.

\* \* \* \* \*